United States Patent [19]

Takasugi

[11] Patent Number: 4,659,897

[45] Date of Patent: Apr. 21, 1987

[54] METHOD OF MAKING A WATCHCASE

[75] Inventor: Tsuneji Takasugi, Tanashi, Japan

[73] Assignee: Citizen Watch Co., Ltd., Tokyo, Japan

[21] Appl. No.: 822,969

[22] Filed: Jan. 28, 1986

Related U.S. Application Data

[63] Continuation of Ser. No. 491,728, May 5, 1983, abandoned.

[30] Foreign Application Priority Data

May 6, 1982 [JP] Japan ................................ 57-75910
May 7, 1982 [JP] Japan ................................ 57-76182

[51] Int. Cl.[4] ............................................ B23K 11/14
[52] U.S. Cl. ........................................ 219/93; 29/179
[58] Field of Search ...................... 219/93, 117.1, 118, 219/85 CM; 29/179; 368/309, 281, 282

[56] References Cited

U.S. PATENT DOCUMENTS

| | | | |
|---|---|---|---|
| 4,087,894 | 5/1978 | Kuechli et al. | 29/179 |
| 4,382,172 | 5/1983 | Takasugi | 219/137 R |
| 4,409,460 | 10/1983 | Nishii et al. | 219/93 |
| 4,495,397 | 1/1985 | Opprecht et al. | 219/93 |

FOREIGN PATENT DOCUMENTS

| | | | |
|---|---|---|---|
| 13568 | 3/1981 | Japan | 29/179 |
| 103380 | 8/1981 | Japan | 368/281 |
| 106494 | 7/1982 | Japan | 219/85 R |
| 191582 | 11/1982 | Japan | 219/85 M |

*Primary Examiner*—E. A. Goldberg
*Assistant Examiner*—C. M. Sigda
*Attorney, Agent, or Firm*—Roberts & Floyd

[57] ABSTRACT

A method of making a watchcase, in which two projections are formed on a joining surface of a part of the watchcase, such as a band connecting lug. The part is joined to another part such as a case body by projection welding to make the watchcase.

3 Claims, 13 Drawing Figures

METHOD OF MAKING A WATCHCASE

This application is a continuation of application Ser. No. 491,728, filed May 5, 1983, now abandoned, by Tsuneji Takasugi, entitled METHOD OF MAKING A WATCHCASE.

BACKGROUND OF THE INVENTION

The present invention relates to a method of making a watchcase.

There has already been provided a watchcase which is made by joining or assembling parts of the watchcase, such as a case body, decorative parts and watch bands. As a method of joining or assembling such parts for forming a watchcase, brazing, adhering with organic adhesive or snug fitting is employed.

In the adhering with organic adhesive, a skillful connecting operation and a long process time are required. Further, it is difficult to avoid the deterioration of the organic adhesive so that reliability of the adhesion is not ensured.

In the method by snug fitting, since high accuracy in dimensions of parts is required, the manufacturing of parts is very difficult.

In the process by brazing, complicated brazing operation in a furnace at a high temperature raises the manufacturing cost. When a watchcase is subjected to a high temperature in the furnace, the metal as a material of the parts if recrystallized or oxidized by the atmosphere in the furnace, which will cause cloudy surface of watchcase or deterioration of the quality of the finished surface. Further, a part of the filler metal of the brazing flows out to violate the cleanliness of the watchcase. Accordingly, it is necessary to correct such defective portions after the assembling or joining of the parts.

In order to prevent the discharge of the filler metal, a brazing resist consisting of metallic oxide is applied to a portion to be protected to cover the portion. However gases are produced by the reaction of the brazing resist during the heating in the furnace, so that colors of the watchcase and band are changed. Further, the brazing resist must be removed after brazing and it is difficult to completely remove the brazing resist.

SUMMARY OF THE INVENTION

An object of the present invention is to provide a method of making a watchcase which may eliminate above described disadvantages in conventional methods.

According to the present invention, there is provided a method of making a watchcase comprising forming projections on a joining surface of a first part of said watchcase; joining said part to a second part by projection welding to make said watchcase.

Other objects and features of the present invention will become more apparent from the following description with reference to the accompanying drawings.

DESCRIPTION OF THE PREFERRED EMBODIMENTS

Figure 1:
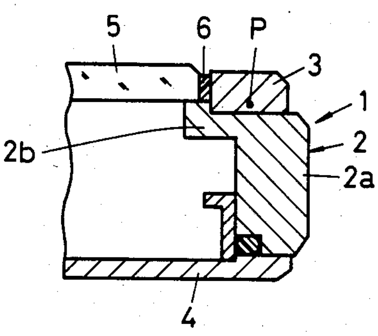
FIG. 1 shows a sectional view of a part of a watchcase made by a method according to the present invention.

Referring to FIG. 1, a watchcase 1 made by the present invention comprises a case body 2 made of steel such as ISO (International Standards Organization) 11 and having an axially extending side wall portion 2*a* and a radially extending upper portion 2*b*, an upper member 3 made of Ni-alloy having age-hardening property and a back 4 snugly fitted to the case body 2. A glass 5 is engaged with the inside wall of the upper member 3 on the case body interposing a packing 6.

Figure 2:
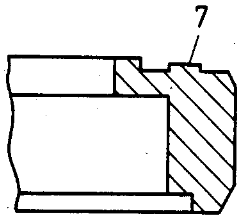
FIG. 2 is a sectional view of a case body before welding.

The case body 2 is manufactured by the sintering, cutting, grinding and abrasive machining of the material. In addition to such ordinal processes, as shown in FIG. 2, four cylindrical projections 7 are formed on the outside of the radially extending upper portion 2*b* of the case body 2 by pressworking. Each projection has a diameter of 0.6 mm and height of 0.1 mm. The underside of the upper member 3 is abutted on the projections 7 and a projection welding is performed at welding pressure of 23 kgf, resistance welding time of 0.06 sec., welding current of 2.6 KA.

As a result of an experiment, tensile strength of this welding was more than 80 kgf so that sufficient joining for the watchcase could be obtained. Further, the heated zone in the upper member by the welding was very small and hardness of the heated portion was maintained at the original hardness of Hv 700 dependent on the age-hardening. At an inner point "P" in FIG. 1, which is at 0.10 mm distance from the welding portion, the hardness was decreased to Hv 580 and the structure of the material of the upper member 3 somewhat changed. However, at a position apart from the welding portion more than 0.13 mm, there is no effect on hardness and structure.

Figure 3:
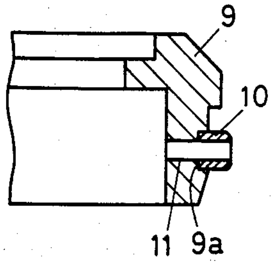
FIG. 3 is a sectional view showing a second embodiment of the present invention.
Figure 4:
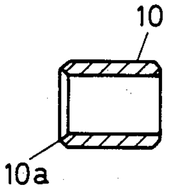
FIG. 4 is a sectional view of a guard tube used in the second embodiment.

FIG. 3 shows a second embodiment of the present invention. A case body 9 made of pure titanium has a hole 11 at an axially extending side wall portion. A recessed shoulder 9*a* is formed in the hole 11 at an outer end thereof for engaging a guard tube 10 made of pure titanium for a winding stem (not shown). As shown in FIG. 4, the guard tube 10 has an edged projection 10*a*.

Projection welding by the projection 10*a* is performed at welding current of 1.6 KA, resistance welding time of 0.04 sec., and welding pressure of 16 kgf. The guard tube is uniformly joined to the recessed shoulder of the hole 11 to provide a watertight join having tensile strength more than 45 kgf.

Figure 5:
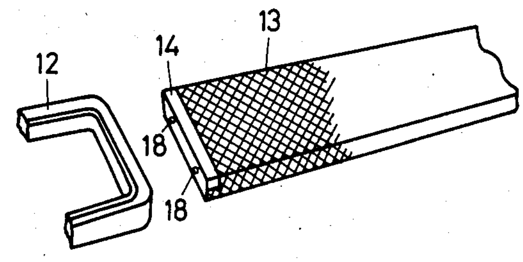
FIG. 5 is a part of a perspective view showing a watchcase and a mesh band of a third embodiment.

FIG. 5 shows a third embodiment of the present invention. A watchcase body 12 is made of Stellite, the brand metal, an alloy of cobalt, chromium and tungsten. A mesh band 13 is formed by netting stainless steel wire.

A connecting member 14 having an L-shaped section is made of stainless steel and joined to one end of the band 13 by brazing in order to accomplish the joining of the band to the case body by welding. A pair of projections 18 are formed on the connecting member 14 by pressworking. Each projection has diameter of 0.5 mm, height of 0.1 mm and the space between two projections is 15 mm.

After the connecting member 14 has been joined to the mesh band 13 by brazing, finishing process of front, rear, and side surfaces of the band is performed. If there is discharged filler metal, it can be easily removed by this process.

Figure 6:
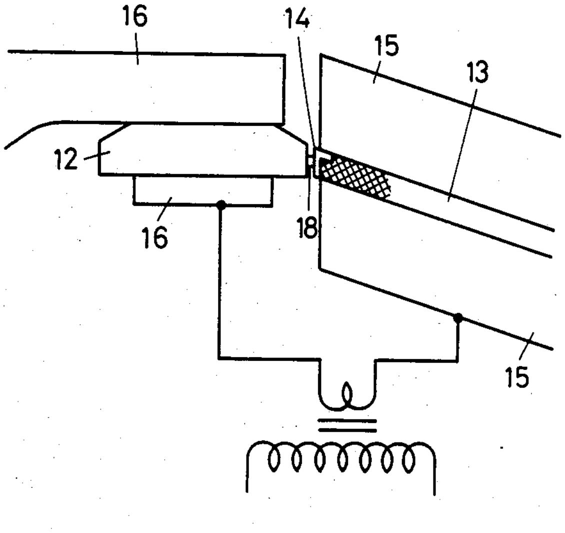
FIG. 6 is a side view of a projection welding.

The projection welding process of the case body 12 and mesh band 13 is shown in FIG. 6. The mesh band 13 is supported by an electrode jig 15 and the body 12 is supported by electrode jig 16. The welding is performed at welding peak current of 2.5 KA, resistance welding time of 0.04 sec., and welding pressure of 25 kgf.

Figure 7:
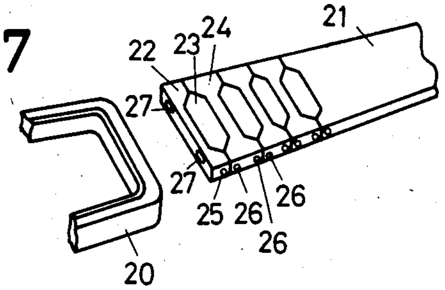
FIG. 7 is a part of a perspective view of a fourth embodiment.

FIG. 7 shows a fourth embodiment. A case body 20 and a metal band 21 are made of stainless steel. The band 21 comprises an end link 22, a middle link 23, and a connecting link 24 which are manufactured by presswork and machining. The end link 22 is connected to the adjacent middle link 23 by connecting screws 25 and the middle link is connected to the adjacent connecting link 24 by connecting pins 26. A pair of projections 27 are provided on an engaging surface of the end link 22 by pressworking. Each projection has 0.5 mm diameter, and 0.1 mm height, and the space between two projections is 12 mm. Weldable metal such as brass, Ni-alloy, or Co-alloy may be employed for the case body and the end link. The front, rear and side surfaces of the integrally connected band 21 are finished by grinding to a finished band having 1.8 mm thickness.

Figure 8:
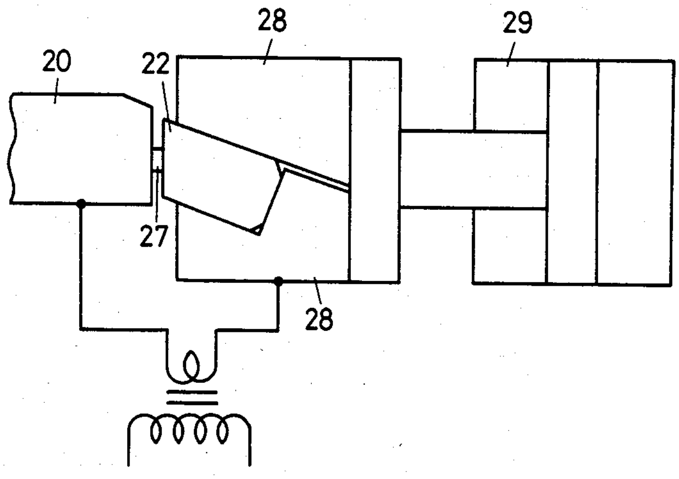
FIG. 8 is a side view of a projection welding.
Figure 9:
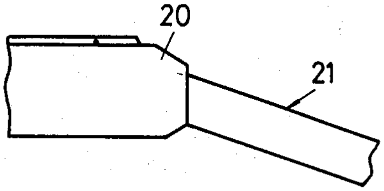
FIG. 9 is a side view of a watchcase after welding.
Figure 10:
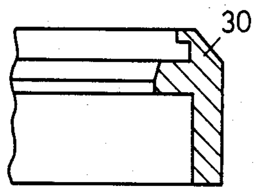
FIG. 10 is a part of a sectional view of a watchcase of a fifth embodiment.
Figure 11:
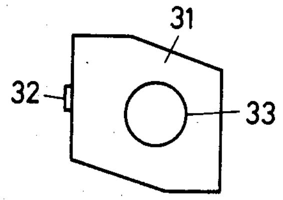
FIG. 11 is a side view of a band connecting member.

As shown in FIG. 8, for the projection welding, the end link 22 is removed from the finished band 21 by loosing the connecting screws 25 and is supported by an electrode jig 28. The projection welding is performed at welding peak current of 2.7 KA, resistance welding time of 0.04 sec., and welding pressure of 20 kgf by a cylinder device 29. The tensile strength at the joined portion is more than 65 kgf. FIG. 9 shows a watchcase after the welding.

Referring to FIGS. 10 to 13 showing a fifth embodiment, a case body 30 is made of stellite consisting of Co as a main component and manufactured by sintering. An inside wall of the case body and a guard tube hole are finished by cutting and an outer profile and a surface of the case body are finished by grinding and abrasive machining. Each band connecting lug or member 31 made of steel such as ISO 20 is formed by pressworking and has a pair of projections 32 and a hole 33 for connecting a band. Each projection 32 has diameter of 0.4 mm and height of 0.1 mm and the space between two projections is 8 mm. Only one band connecting lug 31 is welded to one side of the case body for connecting a band 34.

Figure 12:
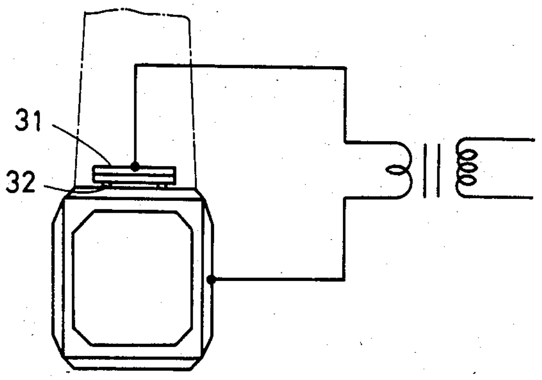
FIG. 12 is a plan view showing a projection welding of the watchcase and the band connecting member.
Figure 13:
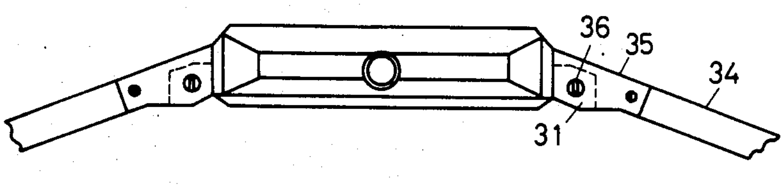
FIG. 13 is a side view of a watchcase.

As shown in FIG. 12, the projection welding is performed by a projection welding machine at welding pressure of 23 kgf, resistance welding time of 20 m second, and welding peak current of 1300 A. The band 34 has a connecting member 35 having a recess which is engaged with the connecting member 31 and both members are connected by screws 36.

Strengths at the welded portion is reliable as shown in Table 1 which shows measuring results of ten test pieces.

TABLE 1

| | Tensile and torque Strengths of a band connecting member | |
|---|---|---|
| | Measured value (n = 10) | Average |
| Tensile breaking load (kg) | 96.8, 83.8, 97.3, 85.0, 77.5<br>87.3, 92.0, 77.3, 82.3, 95.0 | 87.4 |
| Torque breaking load (kg · cm) | 72.0, 73.0, 76.0, 74.0, 64.0<br>88.0, 68.0, 68.0, 84.0, 67.0 | 73.4 |

Table 2 shows results of measuring of nugget diameter at welded portion after breaking tests of the test pieces.

TABLE 2

| Nugget diameter (mm) | |
|---|---|
| Measured value (n = 10) | Average |
| 1.39, 1.27, 1.35, 1.29, 1.25<br>1.23, 1.29, 1.31, 1.34, 1.32 | 1.30 |

In the projection welding of the case body and the band connecting member, if a cylindrical projection is used, it is preferred to form the projection to have a diameter between 0.3 and 0.7 mm, area of 0.07–0.4 $mm^2$, and height of 0.05–0.2 mm so that nugget area after welding becomes 1.2–4.5 $mm^2$. If the diameter is less than 0.3 mm and area is less than 0.07 $mm^2$, nugget area reduces, so that the strength at the welded portion is insufficient for a watchcase. If the height of projection is less than 0.05 mm, a part of melted metal is liable to discharge to a portion other than the projection so that the stable welding effect is not obtained.

If the height of projection is over 0.2 mm, a space remains between the case body and the band connecting member, which will injure the appearance of the watchcase. If the welding pressure or welding current is increased in order to diminish the space, burnt deposit and blister will occur on surfaces of the case body and band.

The number of projection is desirable to be two. If the number of projection is three or more and the height of each projection is not accurate, welding pressure is not equally applied to projections so that expulsion and surface flash occur. Projection may be formed in a column having a section of circle, ellipse, rectangle, or square.

Thus, two projections each of which having area of 0.07–0.4 $mm^2$, height of 0.05–0.2 mm, are provided on the band connecting member and projection welding is performed at welding pressure of 10–50 kg, welding peak current of 700–2000 A. It will be noted that projections may be formed on the outside wall of the case body 30.

From the foregoing it will be understood that the present invention provides a method which may simply and effectively make a watchcase with accuracy at low cost without any defects on the surface of the watchcase.

In projection welding, only projections and extremely small portions surrounding the projections are subjected to a high temperature. Therefore, the watchcase can be made without the decreasing of the quality of the finished surface. Further, the joined portion has a high tensile strength.

The method according to the present invention is effective for the connection of a case body and parts made of age-hardening alloy.

What is claimed is:

1. A method of making a watchcase having a case body, (12), (20), (30) made of metal and a band, (13), (21) made of metal with two ends, said band having two engaging surfaces for connecting the two ends of the band to the case body characterized by the steps of forming two cylindrical projections, (18), (27), (32) on each engaging surface, each cylindrical projection having an area of from 0.07 to 0.40 $mm^2$ and a height of from 0.05 to 0.20 mm and joining the band to the case body by projection welding the two engaging surfaces to the case body.

2. A method according to claim 1 wherein the two engaging surfaces are formed on two connecting members, (14), (31) joined to the two ends of the band.

3. The method according to claim 1 wherein each band has two end links (22) and the two engaging surfaces are formed on the end links of the band.

* * * * *